United States Patent [19]

Knapczyk

[11] Patent Number: 4,670,308
[45] Date of Patent: Jun. 2, 1987

[54] SURFACE COATING PROCESS

[75] Inventor: Jerome W. Knapczyk, Wilbraham, Mass.

[73] Assignee: Monsanto Company, St. Louis, Mo.

[21] Appl. No.: 852,880

[22] Filed: Apr. 22, 1986

Related U.S. Application Data

[63] Continuation-in-part of Ser. No. 757,037, Jul. 19, 1985, Pat. No. 4,590,101.

[51] Int. Cl.$^4$ .......................... B05D 3/02; B05D 3/12
[52] U.S. Cl. .................................. 427/350; 427/385.5;
427/386; 427/389.7; 525/298; 525/306
[58] Field of Search ................... 427/350, 385.5, 386,
427/389.7; 525/298, 306

[56] References Cited

U.S. PATENT DOCUMENTS

| | | | |
|---|---|---|---|
| 4,199,492 | 4/1980 | Roth | 525/193 X |
| 4,296,227 | 10/1981 | Seeburger et al. | 526/320 |
| 4,520,184 | 5/1985 | Van Eenam | 526/320 |

*Primary Examiner*—Michael R. Lusignan
*Attorney, Agent, or Firm*—Thomas E. Kelley; R. Bruce Blance; William J. Farrington

[57] ABSTRACT

A process for coating a substrate with a film comprising an $\alpha,\beta$-ethylenically unsaturated compound, a $\beta,\gamma$-unsaturated ether activator compound, an effective amount of a free radical polymerization initiator, and, optionally, a catalytic amount of metal drier. The components are applied to the substrate and the coated substrate is then placed in an atmosphere substantially free of oxygen until the coating has cured to a substantially tack-free condition.

24 Claims, No Drawings

SURFACE COATING PROCESS

This application is a continuation-in-part of U.S. application, Ser. No. 757,037, filed July 19, 1985, now U.S. Pat. No. 4,590,101, patented May 20, 1986.

This invention relates to a surface coating process and more particularly it relates to a process involving solventless or concentrated solutions of coating compositions containing unsaturated compounds, which are cured rapidly in an oxygen-deficient atmosphere.

Ethylenically unsaturated compounds have for many years been cured by electron beam radiation in an anaerobic atmosphere. Although the process is extremely fast, the EB equipment is expensive, space demanding and places limits on the shapes and configurations of substrates which can be efficiently cured.

Attempts to cure unsaturated compounds with peroxide or azoinitiators usually result in incompletely cured coatings. Attempts to cure these coatings under practical, oxygen deprived conditions have largely been unsuccessful because of the difficulty of removing trace amounts of oxygen. Use of plastic layering or the addition of a wax that exudes to the surface to provide an anaerobic environment produces cured coatings with surface defects that prevents their use for many applications requiring a clear, glossy surface.

Coating compositions comprising polyacrylyl compounds, polyallyloxy compounds, metallic drier and organic hydroperoxide have been disclosed as suitable compositions for free-radical cure under aerobic or anaerobic conditions. However such compositions have a rather short pot life. Isocyanate coating compositions have been cured by a process called "Vapocure" in which the coated compositions are placed in a controlled anaerobic atmosphere containing a volatile amine catalyst. Generally the controlled atmosphere is obtained in a chamber connected to ante-chambers to isolate the curing chamber from the surrounding atmosphere and limit the escape of toxic amine vapors. The cure rate is dependent on the concentration of amine in the chamber atmosphere and on the thickness of the coating. Indeed thick films may not cure completely in their innermost depths. Constant recycle of the atmosphere, with monitoring of amine concentration and addition of fresh amine, complicates the process. The cured products are often characterized by an unpleasant amine odor.

The present invention is directed to a process of coating a substrate with a film of cured polymer in which a first component of the coating composition comprising an α,β-ethylenically unsaturated compound capable of undergoing free radical polymerization is mixed with a second component of the coating composition comprising an effective amount of a β,γ-unsaturated ether activator compound having at least one α-hydrogen and a third component of the coating composition comprising an effective amount of a free radical polymerization initiator. The third component may be mixed with the first or second components prior to admixing or with the admixture. The mixture is applied to the substrate and allowed to dry, and the substrate is then simply placed in an oxygen-deficient atmosphere until it has cured to a tack-free condition. Alternatively, the third component may be applied to the substrate as a separate component, either before or after the application of the admixture of the first two components. Advantageously an effective amount of a metal drier may be used to catalyze the cure when a low temperature cure is desired and can be added to the coating composition with the α,β-ethylenically unsaturated compound or as a separate component prior to application of the coating composition or it may be spray applied to the coating composition after it has been applied to the substrate. The process is characterized by its relatively rapid curing rate, by its thorough cure of thick coatings, by its use of high solids or solvent free systems, by its energy efficiency, by its ease of application to any contoured or shaped surface and by its freedom from obnoxious odors. The activator compound renders the mixed coating composition highly active for cure in the presence of low concentrations of oxygen even at room temperature so that heating and extraordinary precautions to eliminate oxygen from the atmosphere of the curing chamber are not necessary to attain full cure. On the other hand curing is retarded long enough under ambient air conditions so that reasonable open times are possible to aid processing requirements. Thus a coating may be applied to a substrate in air or an oxygen-rich atmosphere, such as where it is allowed to flow out or meet other processing requirements and then cured sometime later when the coated substrate is placed in an oxygen deprived environment. However the process of the invention does not exclude application of the coating to a substrate already contained in an oxygen deprived environment.

Suitable activator compounds are selected from β,γ-unsaturated ethers having at least one α-hydrogen atom in which the activator group may be represented by the following formula:

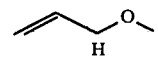

The β,γ-unsaturated ether activator compound has an equivalency less than about 300, based upon the number of β,γ-unsaturated ether groups having an α-hydrogen, a molecular weight less than about 10,000, and has from 1 to 60 β,γ-unsaturated ether groups.

The β,γ-unsaturated ether activator compounds are generally aliphatic in character. The β,γ-unsaturated linkage may a triple bond as in propargyl methyl ether, dipropargyl ether, tripropargyl trimethylol propane, or hexapropargyl sorbitol. Preferably, the activator compound contains a β,γ-ethylenically unsaturated group, referred to hereinafter as an allyloxy group. Exemplary of allyl ethers according to the invention are the following: methyl allyl ether, methyl methallyl ether, butyl allyl ether, diallyl ether, allyl methallyl ether, dicrotyl ether di-(2-chloro-2-propenyl) ether, di-(2-phenyl-2-propenyl) ether, di(1-methyl-2-propenyl) ether, 1-phenyl-2-propenyl ether, di-(3-phenyl-2-propenyl) ether, di-(2-isopropyl-2-propenyl) ether, 1,4-diallyl oxy-2-butene, 1,4-diallyloxy-2-butyne, 1,6-diallyl oxyhexane, 1,4-dimethallyloxypentane, 2,5-dimethoxy-2,5-dihydrofurnan, allyl glycidyl ether; activator compounds prepared from the ionic polymerimzation of allyloxyalkyl acrylates, methacrylates, acrylamides or the allyloxy derivatives of vinyl ethers, such as poly(allyloxyethylmethacrylate) and poly(allyl vinyl ether); activator compounds wherein the allyloxy group forms part of an oligomeric backbone, such as poly(2-buten-1,4-diol) or 2,5-poly(2,5-dihydrofuran).

Preferred allyloxy activator compounds may be selected from the group of polyethers and polyesters represented by the structural formulae:

$$R_1((E)_m R_2)_n$$

where $R_1$ is a radical of molecular weight less than about 10,000 obtained by removal of active hydrogen from an active hydrogen compound selected from the group consisting of water, alcohols, thiols, carboxylic acids, carboxylic amides and amines, where the functionality of $R_1$ is n and is in the range of 1 to 10, where E is a divalent radical selected from the group represented by the formulae $$CH_2-CH-O \text{ and } CH_2-\overset{X}{\underset{X}{C}}-(CH_2)_a-O-\overset{O}{\underset{\|}{C}}-R_3-\overset{O}{\underset{\|}{C}}-O$$

where the X groups are independently selected from the group consisting of H, $CH_3$, $C_2H_5$ and $CH_2OCH_2Y$, Y being selected from the group consisting of $CH=CH_2$, $H_3C-C=CH_2$, and $H_5C_2-C=CH_2$, where a is 0 or 1, where $R_2$ is hydrogen or an unsubstituted or substituted $C_1$ to $C_{10}$ hydrocarbyl radical, where $R_3$ is a divalent unsubstituted or substituted $C_2$ to $C_{10}$ hydrocarbyl radical and where the product of m and n is at least 4 and not more than about 60. It is anticipated that any of the hydrogens in Y, except at least one alpha to the ether group, can be replaced with a lower alkyl without substantially affecting the invention and that the resulting compounds would be equivalent to those according to the invention. Polyethers containing an allyloxy group may be prepared by ionic polymerization of allyl glycidyl ether or mixtures of allyl glycidyl ether and the appropriate alkylene oxide and polyesters containing an allyloxy group may be prepared by polymerization of a suitable dicarboxylic acid and the monoallyl ether of glycerol. Suitable polyesters may also be prepared by substituting for the monoallyl ether of glycerol, the monoallyl ether of trimethylolethane, the monoallylether of trimethylolpropane, the monoallyl ether of pentaerythritol, the diallyl ether of pentaerythritol and similar mono and polyallyl ethers of polyols. Allyl glycidyl ether or methallyl glycidyl ether may also be substituted for the monoallyl ether of glycerol.

Another group of preferred allyloxy activator compounds is represented by the structural formula:

$$R_4(OCH_2Y)_p$$

where $R_4$ is a $C_2$ to $C_{12}$ aliphatic hydrocarbyl or oxahydrocarbyl radical of equivalence p in the range of 2 to 12 and Y is a group as defined hereinabove. Such compounds include tetrallyl pentaerythritol, hexaallyl dipentaerythritol, hexallyl sorbitol, hexamethallyl mannitol, tetraallyl-$\beta$-methyl glucoside, and decaallyl sucrose.

Yet another group of preferred allyloxy activator compounds are acetals derived from allyl alcohol or methallyl alcohol and aldehydes and those derived from a polyol and an acrolein compound represented by the structural formulas:

$$R_5(CH(OCH_2Y)_2)_q \text{ and } R_6(O_2CHY)_r$$

where $R_5$ is absent or is a $C_1$ to $C_{20}$ unsubstituted or a substituted hydrocarbyl group, Y is a group as defined hereinabove and q is in the range of 2 to about 30; and where $R_6$ is a radical of molecular weight less than about 10,000 obtained by removal of at least two active hydrogens from a polyol and r is in the range of about 1 to about 170. Such compounds include 1,1,2,2-tetrakis(allyloxy)ethane, 1,1,6,6-tetrakis(allyloxy)hexane and those derived from acrolein, methacrolein or crotonaldehyde and a polyol and those derived from polyacrolein and acrolein copolymers. Exemplary are triallylidine sorbitol and the polyacrolein acetal or polyvinyl alcohol.

The more preferred allyloxy activator compounds are the polyether and polyacetal compounds in which the number of allyloxy groups per average molecule is in the range of 2 to 40 and the allyloxy equivalent is less than about 250. Most preferably the allyloxy equivalent is less than about 150.

The $\alpha,\beta$-ethylenically unsaturated compound of the present invention is a non-air-curing, free-radical-polymerizable monomer or oligomer or mixture of monomers or oligomers. The nature of the molecule is not critical so long as it is activated towards free-radical polymerization via the double bonds when it is brought into reactive admixture with a free-radical initiator. Such unsaturated monomers include among other types, acrylic monomers, styrenic monomers, vinyl ethers, vinyl esters, vinyl imides, vinyl amides, maleates and fumarates. Preferred monomers are acrylyl monomers and oligomers and maleate and fumarate monomers and oligomers of number average molecular weight less than about 4000 containing from about 1 to about 10 unsaturated groups per molecule. A particularly preferred group of acrylyl monomers is represented by the structure:

$$(CH_2=\overset{R_7}{\underset{|}{C}}-\overset{O}{\underset{\|}{C}})_r Z$$

where $R_7$ is selected from the group consisting of H, $CH_3$ and $C_2H_5$, where r is an integer in the range of 1 to 10 and Z is a saturated or ethylenically unsaturated residue of an alcohol or polyol, a carboxylic acid or poly carboxylic acid, an amine or a polyamine, an epoxide or polyepoxide or an isocyanate or polyisocyanate of a number average molecular weight less than about 4000 containing a hydrocarbon, ester, amide, ether or urethane backbone. Such monomers may be obtained by reaction of acryloyl, methacryloyl or ethacryloyl chloride with an alcohol, a polyol, an amine, or a polyamine or by the reaction of acrylic acid, methacrylic acid or ethacrylic acid with an epoxide, a polyepoxide, an isocyanate, or a polyisocyanate, or by reaction of a hydroxyalkyl acrylate, methacrylate or ethacrylate with a carboxylic acid, polycarboxylic acid, an epoxide, a polyepoxide, an isocyanate, or a polyisocyanate. Such monomers include methyl acrylate, methyl methacrylate, butyl acrylate, 1,3-butylene glycol diacrylate, 1,6-hexanediol diacrylate, the polyacrylates, polymethacrylates and polyethacrylates of polyethylene glycols and polyols, polypropylene glycols and polyols and poly(tetramethylene glycols) and poly(tetramethylene) polyols of molecular weight in the range of 100 to 4000, pentaerythritol tetracrylate, trimethylolpropane triacrylate, dipentaerythritol monohydroxypentacrylate, ethoxylated bisphenol A dimethacrylate, the diacrylates, dimethacrylates and diethacrylates of epoxy compounds formed from bisphenol A and epichlorohydrin of molecular weight in the range of 200 to 4000, and the polyacryloyl monomers prepared by reacting isocyanate capped polyethers and isocyanate capped polyesters of molecular weight up to 4000 with hydroxyethyl acrylate.

In the method of this invention a free radical polymerization initiator is included with the activator compound. Homolytic decomposition of these initiators provides a ready source of radicals which are propagated by the activator compound and initiate copolymerization of the $\alpha,\beta$-ethylenically unsaturated compound and the activator to yield a solvent resistant film. When the initiator is used without the activator, even traces of oxygen interact with the free radicals generated by the initiator, effectively reducing the concentration of free radicals and inhibiting the polymerization. As a result a lengthy induction period occurs and poorly cured films are obtained. Examples of free radical polymerization initiators include hydrogen peroxide, tert-butyl hydroperoxide, methyl ethyl ketone peroxide, cumene hydroperoxide, benzoyl peroxide, lauroyl peroxide and azo-bis(isobutyl nitrile). Also suitable are the oxidized versions of the activator compound which may be prepared by exposing the activator to air or oxygen until the desired initiating activity is obtained.

Interaction between the components of the coating system, namely the components comprising initiator and activator and the $\alpha,\beta$-unsaturated component can take place without a catalyst. Generally initiation without a catalyst requires elevated temperatures before acceptable reaction rates can be achieved. The use of minor amounts of a metal drier catalyst selected from those conventionally used as driers in coating compositions is usually helpful at a concentration range of from 0.001 to 1.0% by weight of a metallic drier, enabling rapid reaction to occur even at room temperature or lower. The metallic driers may be any of those conventionally used for air-drying or coatings, including the salts and soluble complexes of transition elements such as cobalt and manganese. Typical representatives include cobaltous acetate, citrate, acetylacetonate and 2-ethylhexanoate, and the corresponding soluble manganous salts and complexes. Generally salts are preferred to complexes since they appear to generate higher reaction rates. The metallic drier is usually added in the form of a solution in a suitable solvent that will ensure dispersion of drier throughout the reaction mixture and can be added to the formulation of the admixture with the $\alpha,\beta$-ethylenically unsaturated compound or separately during or after application of the mixture of components to the substrate.

Depending on the end use and the application requirements it may be convenient to add any of the other conventional additives for surface coating compositions such as solvents, pigments, fillers, reinforcing agents, stabilizers, inhibitors and flow control agents.

The proportions of the ingredients can vary widely depending on the compatibility of the major ingredients, namely the activator compound and the $\alpha,\beta$-ethylenically unsaturated compound, and the nature of the coating to be obtained. The major ingredients are advantageously selected to be compatible with one another, to provide an effective amount of the $\beta,\gamma$-unsaturated ether activator compound, i.e., an amount sufficient to provide an increase in the rate of cure of the coating over that under the same conditions without addition of the activator compound, and to avoid impairment of gloss and clarity of the cured coatings. Compatibility is readily determined by mixing the major ingredients and determining the range of mixtures which do not form cloudy solutions or coatings or separate into phases. Provided that the major ingredients are suitably compatible, a weight range of activator to $\alpha,\beta$-ethylenically unsaturated compound in the range of from 70:30 to 1:99 can be used. Preferably this ratio will be in the range from 40:60 to 5:95 to provide an adequate rate of cure and an adequate level of mechanical properties in the cured coating. The concentration of initiator in the combined weight of initiator, activator and $\alpha,\beta$-unsaturated compound components can vary from about 1 to about 100 meq per 100 g. and preferably from about 5 to about 30 meq per 100 g to provide an adequate rate of cure without excessive generation of by-products.

In one embodiment of the invention, the third component comprising the initiator can be provided as hydroperoxy substituents of the activator, thus dispensing with the need to add the initiator as a separate chemical entity. Hydroperoxy substituents can be provided by air or oxygen sparging of the activator at a temperature in the range of about 25° C. to about 100° C. for a time in the range of about 0.5 hour to about 10 days until the desired hydroperoxide level is obtained. At the higher levels of hydroperoxy substitution excessive viscosity increase can occur and the hydroperoxy activator may become discolored an manifest a tendency to gelation upon storage.

Curing of the coating composition after it has been deposited on the substrate can be carried out at temperatures of 250° C. or lower. Though the cure rate will usually increase as the temperature increases the preferred cure temperature for low energy curing is 10° C. to 60° C. and the initiator and its concentration are selected to be effective in this temperature range.

The compositions of this invention applied to a substrate may cure in minutes to several hours or not cure at all under ambient air conditions. However when a substrate coated with these compositions is placed in an oxygen deprived environment the cure rate increases dramatically.

In the coating process of the present invention, the first component comprising the $\alpha,\beta$-ethylenically unsaturated compound is mixed with the second component comprising the activator, and the mixture is applied to the substrate. The third and fourth components may be mixed with either of the first two components or with the admixture or may be applied separately to the substrate or sprayed on the admixture of the first two components after the admixture is applied to the substrate. The order and method of application is not critical so long as the initiator and, optionally, metal drier are supplied in effective concentrations. Because of the limited pot life of the mixture, when the third component, the initiator, is mixed with the first two components, the three components are advantageously supplied continuously in the desired weight ratio to a mixer-applicator or a spray gun and thereafter mixed and applied or sprayed onto the substrate. Alternatively the $\alpha,\beta$-ethylenically unsaturated compound may be mixed in the applicator or spray gun with a stream containing the second and third components, and the mixture is then immediately applied or sprayed onto the substrate, optionally pretreated with catalyst or followed by application or spraying of the catalyst to the coated substrate. When the components of the coating composition are diluted with solvent to provide a suitable viscosity for spray application and flow, especially when the compositions contain a high pigment loading, the coated substrate is allowed to dry in air or in an oxygen rich atmosphere until the solvent is substantially volatilized, optionally with application of heat to hasten the evaporation of solvent. When thick films are required, multiple coatings may be applied and solvent evaporated after each application. After the solvent has been evaporated, the coated substrate is transferred to a chamber capable of providing an oxygen deficient inert atmosphere for example by application of vacuum or by substantial displacement of air in the chamber with nitrogen or other oxygen-deficient gas. Rapid cure of the coated composition occurs in a matter of minutes or even seconds after the coated substrate enters the chamber and can be further hastened by application of heat. However especially when the coating composition is a high solids system free from solvent, the composition may be mixed and sprayed by means of a nitrogen spray and the mixed composition may be applied directly to the substrate in the oxygen deficient atmosphere.

The components of the coating composition may also be prepared as aqueous dispersions with or without pigments. The dispersions are formulated with conventional surfactants to provide stable dispersions. Preferably in such aqueous dispersions the catalyst is an organic solvent soluble metallic drier such as cobalt 2-ethylhexanoate rather than a water soluble salt such as cobaltous acetate so that uniform dispersion of the catalyst in the organic phase of the coating composition is obtained. However, it can be advantageous to use water soluble salts to allow the coating composition to be applied and to flow out before the water is evaporated and cure is accelerated.

The following examples are set forth to illustrate the present invention and should not be construed as limiting its scope. Quantities and percentages are by weight unless otherwise indicated.

Examples A–G describe the production of activator compounds useful in the process of this invention.

EXAMPLE A

Preparation of Ethylene-10 Allyl Glycidyl Ether

A reaction vessel is charged with ethylene glycol which is reacted with allyl glycidyl ether in a 1:10 mole ratio in the presence of boron trifluoride/etherate catalyst at a temperature in the range of about 75°–80° C. The allyl glycidyl ether is added gradually over a period of five hours. The catalyst is neutralized with aqueous sodium hydroxide solution and after removal of the aqueous layer the residue is dried and filtered. The liquid product obtained has a Gardner viscosity at 25° C. of F. The allyloxy equivalent is about 120.

EXAMPLE B

Preparation of Sorbitol-30 Allylglycidyl Ether

Similar to A except that sorbitol is reacted in a 1:30 ratio with allyl glycidyl ether. The allyloxy equivalent is about 120.

EXAMPLE C

Preparation of Methyl Alcohol-5 Allyl Glycidyl Ether

Similar to A except that methyl alcohol is reacted in a 1:5 ratio with allyl glycidyl ether. The allyloxy equivalent is about 120.

EXAMPLE D

Preparation of 2-Propylene Oxide 3-Allyl Glycidyl Ether Oligomer

To a cooled, rapidly stirring solution containing 250 parts by weight of toluene, 45 parts by weight of allyl alcohol and 10 parts by weight of boron trifluoride etherate at 12° C., is added over a six hour period a solution of 600 parts by weight allyl glycidyl ether and 400 parts by weight of propylene oxide. During the addition the temperature of the reacting mixture is gradually raised to 75° C. When addition is complete a solution of 32 parts by weight sodium carbonate in 150 parts by weight of water is added to the reaction mixture. After the aqueous layer settles out it is drawn off and the organic layer is devolatilized for about one hour at 125° C., under reduced pressure. The colorless organic residue is used without further modification. Its allyloxy equivalent is about 160.

EXAMPLE E

Preparation of Adipic Acid-Allyl Glycidyl Ether-Tetradecyldiol Polyester Compound Into a 3-liter flask equipped with a stirrer, thermometer, dropping funnel and condenser, continually maintained under a blanket of nitrogen, is added 816.9 g of adipic acid, 425.1 g of allyl glycidyl ether, 356.6 g of $C_{14}$-diol (Sartomer, SR-100), 100.6 g 2-ethyl hexanol and 286.0 g of toluene. When these components are thoroughly mixed, a solution of 3.4 g of tributylamine dissolved in 14.3 g of toluene is added. The mixture is gradually heated to 124° C. and maintained at this temperature until the acid equivalent reaches 3.54 meq./g. The mixture is cooled to room temperature and dissolved in 1000 ml of dry acetone containing 100 ml of methanol. The solution is stirred for one hour with 107 g of AMBERLYST® 15 (Rohm and Haas) cation exchange resin and then the acetone-methanol solvent is removed by distillation. A solution of 5.7 g of stannous octoate dissolved in 10 g of toluene is added and the reaction mixture is azeotropically distilled until no more water evolves and the reaction temperature reaches 170° C. After cooling to room temperature the mixture is diluted with 2 liters of acetone and filtered and the volatiles are stripped by rotoevaporation. Acid equivalent of the product: 1.03 meq/g.

EXAMPLE F

Preparation of Triallylidine Sorbitol

Triallylidine sorbitol is prepared from sorbitol and acrolein according to the procedure described by R. F. Fischer and C. W. Smith, *J. Org. Chem.*, 25, 319 (1960).

EXAMPLE G 1,4-Diallyloxy-2-Butene 1,4-diallyloxy-2-butene is commercially available from Monomer-Polymer and Dajac Laboratories, Inc. located at Trevose, PA.

EXAMPLES 1 AND 2 AND COMPARATIVE EXAMPLES C1–C12

The components of coating compositions set forth in Table 1 are prepared from the following ingredients:

$M_1$, an 80% solution of the diacrylate ester of a bisphenol A epoxy resin of molecular weight 840 in methyl ethyl ketone (MEK);

$M_2$, an 80% solution of the diacrylate ester of a hydroxy terminated urethane compound and ethoxyethoxyethyl acrylate (weight ratio 9:1) in methyl ethyl ketone;

A, the activator compound of Example A;

TBH, t-butyl hydroperoxide; and

CoK, a solution of cobalt potassium metal complex fatty acid salt sold by Tenneco under the tradename "Nuocure CK", in methyl ethyl ketone providing 1.0 g metal per 100 ml of solution.

Examples 1 and 2 are used to demonstrate the process of the present invention in comparison with examples C1 to C12 which illustrate the effect of omitting ingredients from the compositions.

TABLE 1

Three Component Coating Compositions

| Coating Composition | Component I, pbw | Components II and III, pbw |
|---|---|---|
| C1 | $M_1$, 4.0; MEK 1.0 | A, 1.0 |
| C2 | $M_1$, 4.0; MEK 1.0 | A, 1.0; TBH, 0.09 |
| C3 | $M_1$, 4.0; MEK 1.2; CoK 0.0020 | A, 1.0 |
| 1 | $M_1$, 4.0; MEK 1.2; CoK 0.0020 | A, 1.0; TBH, 0.09 |
| C4 | $M_1$, 4.0; MEK 1.0 | TBH, 0.09 |
| C5 | $M_1$, 4.0; MEK 1.2; CoK 0.0020 | TBH, 0.09 |
| C6 | $M_1$, 4.0; MEK 1.0 | — |
| C7 | $M_2$, 4.0; MEK 1.0 | A, 1.0 |
| C8 | $M_2$, 4.0; MEK 1.0 | A, 1.0; TBH, 0.18 |
| C9 | $M_2$, 4.0; MEK 1.25; CoK 0.0025 | A, 1.0 |
| 2 | $M_2$, 4.0; MEK 1.25, CoK 0.0025 | A, 1.0; TBH, 0.18 |
| C10 | $M_2$, 4.0; MEK 1.0 | TBH, 0.18 |
| C11 | $M_2$, 4.0; MEK 1.25; CoK 0.0025 | TBH, 0.18 |
| C12 | $M_2$, 4.0; MEK | — |

The three components are mixed together and the mixture is applied to two sets of glass panels using a 3.0 mil (76 micron) doctor blade providing a 2.4 mil (61 micron) dry film. After 15 minutes under ambient conditions to allow solvent to evaporate, one set of panels is placed in a nitrogen gas filled chamber at 27° C. The other set of coated panels is left to cure under ambient air conditions.

All cured samples are evaluated for MEK double rub resistance 24 hours after reaching the tack-free state. Pencil hardness is evaluated 48 hours after achieving the tack-free state. The results are shown in Table 2.

TABLE 2

| | Anaerobic Conditions | | | Air Dry Conditions | | |
|---|---|---|---|---|---|---|
| Coating Composition | Tack-free Time (Min) | MEK Rubs | Pencil Hardness | Tack-Free Time (hours) | MEK Rubs | Pencil Hardness |
| C1 | >30 | 0 | tacky | >24 | 0 | tacky |
| C2 | >30 | 0 | tacky | >24 | 0 | tacky |
| C3 | >30 | 0 | tacky | 4.5 | >300 | 4H |
| 1 | 1.5 | >300 | 3H | 2.2 | >300 | 3H |
| C4 | >30 | 0 | tacky | >24 | 0 | tacky |
| C5 | 14 | 60 | F | >24 | 0 | tacky |
| C6 | >30 | 0 | tacky | >24 | 0 | tacky |
| C7 | >30 | 0 | tacky | >24 | 0 | tacky |
| C8 | >30 | 0 | tacky | >24 | 0 | tacky |
| C9 | >30 | 0 | tacky | >24 | 0 | tacky |
| 2 | 1.5 | >300 | F | 1.1 | >300 | H |
| C10 | >30 | 0 | tacky | >24 | 0 | tacky |
| C11 | 9 | 50 | 2B | 1.5 | 30 | HB |
| C12 | >30 | 0 | tacky | >24 | 0 | tacky |

These results clearly show that the activator compound promotes rapid curing under both anaerobic and air dry conditions and produces coatings with superior solvent resistance and hardness compared to coatings not containing the activator. Moreover cure under anaerobic conditions allows the tack free state to be reached about 90 times faster than under air dry conditions.

EXAMPLES C-13 and 3–6

These examples show how changing the concentration of catalyst affects cure properties.

The coating compositions are made by mixing component I with components II and III, adding catalyst, and immediately applying the mixture to a glass panel with a 1.5 mil (38 micron) doctor blade. The samples are allowed to dry under ambient conditions for 15 min. prior to being placed in an enclosed chamber that is flushed continuously with nitrogen. The temperature of the anaerobic chamber is 26.5° C. The results are recorded in Table 3.

Component I consists of 4.0 parts by weight of a diacrylate ester of a hydroxy terminated urethane compound sold by Sartomer under the tradename Sartomer 0504 in 0.5 parts by weight methyl ethyl ketone. Components II and III consist of 1.0 part by weight of the activator of Example A and 0.09 part by weight t-butylhydroperoxide. The amounts of cobalt/potassium metal catalyst added to Examples C13 and 3–6 as a 1% solution of Nuocure CK in methyl ethyl ketone are respectively 0; 0.001; 0.002; 0.005 and 0.01 parts by weight. MEK solvent resistance and pencil hardness of the cured coating compositions are determined after 24 hours under ambient conditions following the attainment of the tack free state. In the tables which follow NC denotes no cure.

TABLE 3

Effect of Catalyst Concentration on Cure of Coating Compositions

| Coating Composition | C-13 | 3 | 4 | 5 | 6 |
|---|---|---|---|---|---|
| Catalyst, % CoK metal by dry weight | 0 | 0.02 | 0.040 | 0.10 | 0.20 |
| Tack-free Time (sec.) | NC | 45 | 25 | 10 | 10 |
| MEK Rubs | 0 | 300 | 300 | 150 | 150 |
| Pencil Hardness | — | HB | HB | HB | HB |

EXAMPLES C-14 and 7–10

These examples show how changing the concentration of activator, affects cure properties. The ingredients are the same as those of Examples 3–6, formulated as set forth in Table 4.

TABLE 4

Coating Compositions of Examples C-14 and 7-10

| Coating Composition | Component I, pbw | Component II pbw | Catalyst, Co, pbw |
|---|---|---|---|
| C-14 | $M_2$, 5.0; MEK 0.5 | A, 0.0; TBH, 018 | 0.0020 |
| 7 | $M_2$, 4.5; MEK 0.5 | A, 0.5; TBH, 0.18 | 0.0020 |
| 8 | $M_2$, 4.0 MEK 0.5 | A, 1.0; TBH, 0.18 | 0.0020 |
| 9 | $M_2$, 3.5 MEK 0.5 | A, 1.5; TBH, 0.18 | 0.0020 |
| 10 | $M_2$, 3.0; MEK 0.5 | A, 2.0; TBH, 0.18 | 0.0020 |

The coating compositions are made by mixing component I with components II and III, adding catalyst, and immediately applying the mixture to a glass panel with a 1.5 ml (38 micron) doctor blade. The samples are allowed to dry under ambient conditions for 15 min. prior to being placed in an enclosed chamber that is flushed continuously with nitrogen. The temperature of the anaerobic chamber is 26.5° C. The results are recorded in Table 5.

TABLE 5

Effect of Activator Concentration on Cure of Coating Compositions

| Coating Composition | C-14 | 7 | 8 | 9 | 10 |
|---|---|---|---|---|---|
| Activator concentration % by dry weight | 0 | 9.7 | 18.3 | 28.0 | 38.6 |
| Tack-free Time (sec.) | N.C. | 150 | 45 | 45 | 75 |
| MEK Rubs | — | 300 | 300 | 300 | 300 |
| Pencil Hardness | — | F | 4H | 4H | 4H |

No cure is observed with coating composition C-14 containing no activator compound. Fast cure occurs when it is present, with an optimum amount in the range of about 18 to 30 percent of the dry coating.

EXAMPLES C-15 AND 11–13

These examples show how changing the concentration of initiator affects cure properties. The coating compositions are made by mixing Component I with Components II and III, adding catalyst, and immediately applying the mixture to a glass panel with a 1.5 mil (38 micron) doctor blade. The samples are allowed to dry under ambient conditions for 15 min. prior to being placed in an enclosed chamber that is flushed continuously with nitrogen. The temperature of the anaerobic chamber is 26.5° C. The results are recorded in Table 6.

Components I and II are the same as Components I and II of Examples 3–6, and Component III is the same as Component III except that the initiator concentration is 0, 0.045, 0.09 and 0.36 parts by weight in Examples C15, 11, 12 and 13 respectively.

TABLE 6

Effect of Initiator Concentration on Cure of Coating Composition

| Coating Composition | C15 | 11 | 12 | 13 |
|---|---|---|---|---|
| Initiator Concentration % by Dry Weight | 0 | 0.89 | 1.77 | 6.72 |
| Tack-free Time (sec.) | NC | 30 | 15 | 15 |
| MEK Rubs | 0 | 300 | 300 | 300 |
| Pencil Hardness | — | 2H | 2H | 4H |

The data show that no cure occurs without initiator even when the activator compound is present, and that cure rate is unaffected by increase in initiator concentration above about 1.5 weight percent.

EXAMPLE 14

This example shows the effect of temperature on the tack-free time of an anaerobically cured composition.

Three samples are made by mixing Component I with Components II and III, adding catalyst, and immediately applying each mixture with a 1.5 mil (38 micron) doctor blade to a glass panel. The solvent is allowed to evaporate for 15 min. under ambient conditions and then the coated panels are placed in a heated chamber which is continuously flushed with preheated nitrogen. The results are recorded in Table 7.

Component I contains 5.0 parts by weight of nonvolatile diacrylate ester of a bisphenol A epoxy resin of 840 molecular weight. Component II contains 1.0 part by weight of the activator compound of Example A and Component III contains 0.09 parts by weight of tertiary butyl hydroperoxide. Cobalt catalyst (0.0020 parts by weight cobalt) is added as a 10% solution of Nuocure CK in methyl ethyl ketone.

TABLE 7

Effect of Temperature on Cure Time

| Coating Composition | Temperature | Tack-free Time |
|---|---|---|
| 14 (1) | 26° C. | 60 sec. |
| 14 (2) | 48° C. | 30 sec. |
| 14 (3) | 68° C. | 10 sec. |

EXAMPLES 15–21 AND C16–C18

These examples illustrate the advantage of using the activator compounds of this invention compared with using some common polyallyl esters.

Samples are prepared and applied as described in Example 4 except that the activator component is varied as shown in Table 8. The coated substrates are cured anaerobically at 26° C. The MEK solvent resistance test is performed after 48 hrs. aging under ambient conditions.

TABLE 8

Comparison of Activator Compounds

| Coating Composition | Activator | Tack-free Time (Min.) | MEK Rubs* |
|---|---|---|---|
| 15 | Example A | <1 | >300 |
| 16 | Example B | <1 | >300 |
| 17 | Example C | 7 | >300 |
| 18 | Example D | <1 | >300 |
| 19 | Example E | 3 | >100 |
| 20 | Example F | <1 | >100 |
| 21 | Example G | 3 | >100 |
| C16 | diallyl malonate | 3 | 25 |
| C17 | tetrallyl pyromellitate | >30 | 0 |
| C18 | diallyl terephthalate | >30 | 0 |

*Compositions 19–21 were only tested to >100 rubs.

I claim:

1. A process for coating a substrate with a film of cured polymer which comprises:
   A. admixing a first component comprising $\alpha,\beta$-ethylenically unsaturated compound capable of undergoing free radical polymerization with a second component comprising an effective amount of a $\beta,\gamma$-unsaturated ether activator compound having at least one $\alpha$-hydrogen;
   B. applying a film of the admixture and of a third component comprising an effective amount of a free radical polymerization initiator to the substrate in an air or oxygen-rich atmosphere, and C. placing the substrate in an atmosphere substantially free of oxygen for a sufficient time to allow the film to cure to a tack-free condition; wherein the β,γ-unsaturated ether activator compound has a molecular weight less than about 10,000 and wherein the weight ratio of α,β-ethylenically unsaturated compound to β,γ-unsaturated ether activator compound is in the range of about 30:70 to about 99:1.

2. The process of claim 1 wherein the third component is mixed with the first or second component or with the admixture prior to step B.

3. The process of claim 1 or 2 wherein a fourth component comprising an effective amount of metal drier catalyst is applied to the substrate.

4. The process of claim 1 or 2 wherein the activator compound is an alloxy compound selected from the group represented by the formulae $R_1((E)_mR_2)_n$, $R_4(OCH_2Y)_p$, $R_5(CH(OCH_2Y)_2)_q$ and $R_6(O_2CHY)_r$ where $R_1$ is a radical of molecular weight less than about 10,000 obtained by removal of active hydrogen from an active hydrogen compound selected from the group consisting of water, alcohols, thiols, carboxylic acids, carboxylic amides and amines, where the functionality of $R_1$ is n and is in the range of 1 to 10, where E is a divalent radical selected from the group represented by the formulae

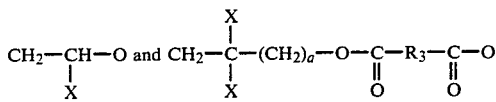

where X is selected from the group consisting of H, $CH_3$, $C_2H_5$ and $CH_2OCH_2Y$, Y being selected from the group consisting of $CH=CH_2$, $H_3C-C=CH_2$ and $H_5C_2-C=CH_2$, where a is 0 or 1, where $R_2$ is hydrogen or an unsubstituted or substituted $C_1$ to $C_{10}$ hydrocarbyl radical, where $R_3$ is a divalent unsubstituted or substituted $C_2$ to $C_{10}$ hydrocarbyl radical and where the product of m and n is at least 4 and not more than about 60; where $R_4$ is a $C_2$ to $C_{12}$ alphatic hydrocarbyl or oxahydrocarbyl radical of equivalence p in the range of 4 to 12; where $R_5$ is absent or is a $C_1$ to $C_{20}$ unsubstituted or a substituted hydrocarbyl group and q is in the range of 2 to about 30; $R_6$ is a radical of molecular weight less than about 10,000 obtained by removal of at least two active hydrogens from a polyol and r is in the range of about 1 to about 170; and wherein the weight ratio of α,β-ethylenically unsaturated compound to allyloxy activator compound is in the range of about 30:70 to about 99:1; and wherein the allyloxy compound contains from 4 to 60 allyloxy groups per allyloxy compound molecule.

5. The process of claim 3 wherein the activator compound is an alloxy compound is selected from the group represented by the formulae $R_1((E)_mR_2)_n$, $R_4(OCH_2Y)_p$, $R_5(CH(OCH_2Y)_2)_q$ and $R_6(O_2CHY)_r$ where $R_1$ is a radical of molecular weight less than about 10,000 obtained by removal of active hydrogen from an active hydrogen compound selected from the group consisting of water, alcohols, thiols, carboxylic acids, carboxylic amides and amines, where the functionality of $R_1$ is n and is in the range of 1 to 10, where E is a divalent radical selected from the group represented by the formulae

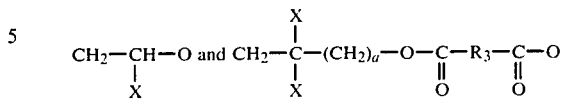

where X is selected from the group consisting of H, $CH_3$, $C_2H_5$ and $CH_2OCH_2Y$, Y being selected from the group consisting of $CH=CH_2$, $H_3C-C=CH_2$ and $H_5C_2-C=CH_2$, where a is 0 or 1, where $R_2$ is hydrogen or an unsubstituted or substituted $C_1$ to $C_{10}$ hydrocarbyl radical, where $R_3$ is a divalent unsubstituted or substituted $C_2$ to $C_{10}$ hydrocarbyl radical and where the product of m and n is at least 4 and not more than about 60; where $R_4$ is a $C_2$ to $C_{12}$ aliphatic hydrocarbyl or oxahydrocarbyl radical of equivalence p in the range of 4 to 12; where $R_5$ is absent or is a $C_1$ to $C_{20}$ unsubstituted or a substituted hydrocarbyl group and q is in the range of 2 to about 30; $R_6$ is a radical of molecular weight less than about 10,000 obtained by removal of at least two active hydrogens from a polyol and r is in the range of about 1 to about 170 and wherein the weight ratio of α,β-ethylenically unsaturated compound to allyloxy activator compound is in the range of about 30:70 to about 99:1; and wherein the allyloxy compound contains from 4 to 60 allyloxy groups per allyloxy compound molecule.

6. The process of claim 3 wherein the fourth component comprising the metal drier catalyst, in the range of 0.001 to 1.0 parts by weight per 100 parts by weight of α,β-ethylenically unsaturated compound and activator compound, is added to the first or second component or to the admixture prior to step B.

7. The process of claim 1 or 2 wherein the admixture contains a solvent and wherein the solvent is allowed to evaporate from the film prior to step C.

8. The process of claim 3 wherein the admixture contains a solvent and wherein the solvent is allowed to evaporate from the film prior to step C.

9. The process of claim 1 or 2 wherein the admixture is an aqueous dispersion and wherein water is allowed to evaporate from the film prior to step C.

10. The process of claim 3 wherein the admixture is an aqueous dispersion and wherein water is allowed to evaporate from the film prior to step C.

11. The process of claim 1 or 2 wherein the weight ratio of α,β-ethylenically unsaturated compound to activator compound is in the range of about 60:40 to about 95:5.

12. The process of claim 3 wherein the weight ratio of α,β-ethylenically unsaturated compound to activator compound is in the range of about 60:40 to about 95:5.

13. The process of claim 4 wherein the weight ratio of α,β-ethylenically unsaturated compound to activator compound is in the range of about 60:40 to about 95:5.

14. The process of claim 1 or 2 wherein the α,β-ethylenically unsaturated compound is of number average molecular weight in the range of 200 to 2000 and contains an average of 2 to 10 ethylenically unsaturated groups per molecule and wherein the activator compound has an equivalency of less than 300 based upon the number of α,β-unsaturated ether groups with at least one α-hydrogen.

15. The process of claim 3 wherein the α,β-ethylenically unsaturated compound is of number average molecular weight in the range of 200 to 2000 and contains an average of 2 to 10 ethylenically unsaturated groups per molecule and wherein the activator compound has an equivalency of less than 300 based upon the number of α,β-unsaturated ether groups with at least one α-hydrogen.

16. The process of claim 4 wherein the α,β-ethylenically unsaturated compound is of number average molecular weight in the range of 200 to 2000 and contains an average of 2 to 10 ethylenically unsaturated groups per molecule and wherein the activator compound has an equivalency of less than 300 based upon the number of α,β-unsaturated ether groups with at least one α-hydrogen.

17. The process of claim 1 or 2 wherein the α,β-ethylenically unsaturated compound is represented by the formula

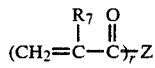

where $R_7$ is selected from the group consisting of H, $CH_3$ and $C_2H_5$, where r is an integer in the range of 1 to 10 and Z is a saturated or ethylenically unsaturated residue of an alcohol, a polyol, a carboxylic acid, polycarboxylic acid, an amine, a polyamine, an epoxide, a polyepoxide, an isocyanate or a polyisocyanate of a number average molecular weight less than about 4000 containing a hydrocarbon, ester, amide, ether or urethane backbone.

18. The process of claim 3 wherein the 60 ,β-ethylenically unsaturated compound is represented by the formula

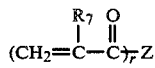

where $R_7$ is selected from the group consisting of H, $CH_3$ and $C_2H_5$, where r is an integer in the range of 1 to 10 and Z is a saturated or ethylenically unsaturated residue of an alcohol, a polyol, a carboxylic acid, a polycarboxylic acid, an amine, a polyamine, an epoxide, a polyepoxide, an isocyanate or a polyisocyanate of a number average molecular weight less than about 4000 containing a hydrocarbon, ester, amide, ether or urethane backbone.

19. The process of claim 4 wherein the α,β-ethylenically unsaturated compound is represented by the formula

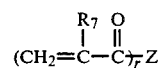

where $R_7$ is selected from the group consisting of H, $CH_3$ and $C_2H_5$, where r is an integer in the range of 1 to 10 and Z is a saturated or ethylenically unsaturated residue of an alcohol, a polyol, a carboxylic acid, a polycarboxylic acid, an amine, a polyamine, an epoxide, a polyepoxide, an isocyanate or a polyisocyanate of a number of average molecular weight less than about 4000 containing a hydrocarbon, ester, amide, ether or urethane backbone.

20. The process of claim 1 or 2 wherein the free radical initiator is selected from t-butyl hydroperoxide, cumene hydroperoxide, methyl ethyl ketone peroxide, lauroyl peroxide, and benzoyl peroxide.

21. The process of claim 3 wherein the free radical initiator is selected from t-butyl hydroperoxide, cumene hydroperoxide, methyl ethyl ketone peroxide, lauroyl peroxide, and benzoyl peroxide.

22. The process of claim 1 or 2 wherein the free radical initiator is provided by a hydroperoxy substituent of the activator compound.

23. The process of claim 3 wherein the free radical initiator is provided by a hydroperoxy substituent of the activator compound.

24. The process of claim 4 wherein the free radical initiator is provided by a hydroperoxy substituent of the activator compound.

* * * * *